Figure 1:
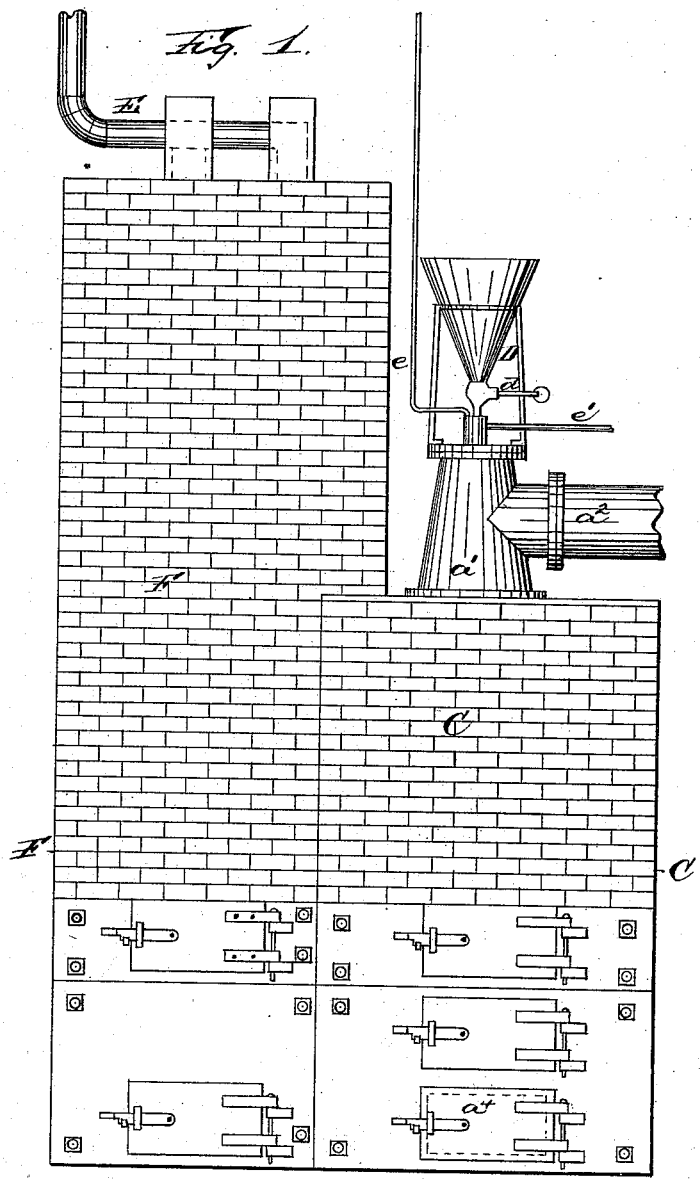

(No Model.)

A. C. BRADLEY.

PROCESS OF MANUFACTURING ORANGE MINERAL AND RED LEAD.

No. 382,070. Patented May 1, 1888.

4 Sheets—Sheet 1.

WITNESSES:

INVENTOR.

(No Model.) 4 Sheets—Sheet 2.

A. C. BRADLEY.

PROCESS OF MANUFACTURING ORANGE MINERAL AND RED LEAD.

No. 382,070. Patented May 1, 1888.

(No Model.) 4 Sheets—Sheet 3.
A. C. BRADLEY.
PROCESS OF MANUFACTURING ORANGE MINERAL AND RED LEAD.
No. 382,070. Patented May 1, 1888.

WITNESSES: INVENTOR (No Model.) 4 Sheets—Sheet 4.
A. C. BRADLEY.
PROCESS OF MANUFACTURING ORANGE MINERAL AND RED LEAD.
No. 382,070. Patented May 1, 1888.
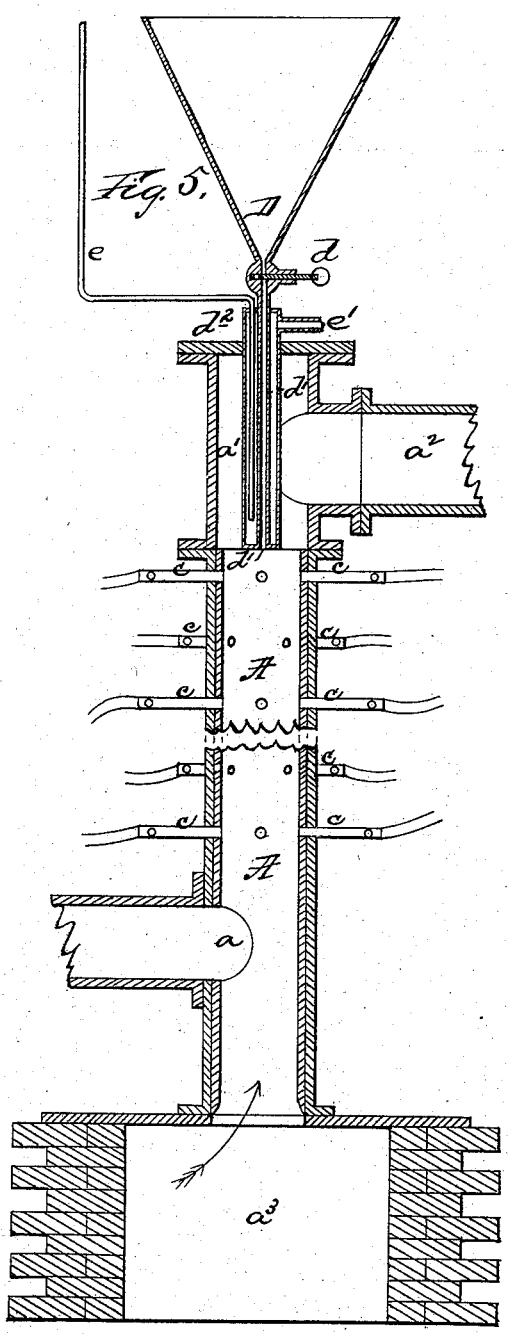
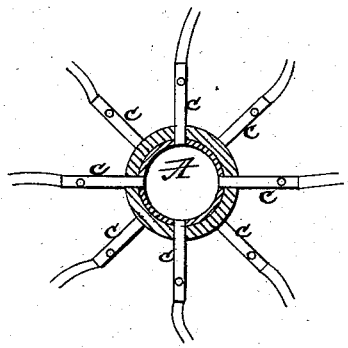
WITNESSES:
INVENTOR.

UNITED STATES PATENT OFFICE.

ARTHUR CROSSMAN BRADLEY, OF BROOKLYN, NEW YORK.

PROCESS OF MANUFACTURING ORANGE MINERAL AND RED LEAD.

SPECIFICATION forming part of Letters Patent No. 382,070, dated May 1, 1888.

Application filed February 23, 1887. Serial No. 228,496. (No model.)

*To all whom it may concern:*

Be it known that I, ARTHUR CROSSMAN BRADLEY, of Brooklyn, in the county of Kings and State of New York, have made an invention of a new and useful Process of Manufacturing Orange Mineral and Red Lead; and I do hereby declare that the following, in connection with the accompanying drawings, is a full, clear, and exact description and specification of the same.

The process which, so far as my knowledge extends, has hitherto been employed in the production of orange mineral is a compound one, the first operation of which consists in the conversion of the metallic lead into what is commonly known as "white lead," or the carbonate of lead, while the second operation consists in decomposing the carbonate and oxidizing the resultant lead by a roasting operation, during which it must be stirred to expose fresh surfaces of the material to air. This compound process involves the large expense of first producing the white lead, and is attended also with the difficulty of effecting the entire oxidation of the material at a single roasting operation. On the other hand, the process which, so far as my knowledge extends, has hitherto been employed in the production of red lead is a compound one, the first operation of which consists, generally, of the oxidation of lead by subjecting a molten mass of it in an open-hearth reverberatory furnace to the action of the products of the combustion of fuel mixed with air, so as to convert the lead into litharge. The litharge is then ground, and is subsequently roasted and stirred in the presence of air. In place of effecting the first operation in a reverberatory furnace it has sometimes been effected by charging the lead in a divided condition into a revolving vessel or retort, the vessel being turned on its longitudinal axis to expose fresh surfaces of the lead to the oxidizing action of air. This compound process of making red lead is attended with the defect that the oxide of lead or litharge produced in the first operation is not in the condition of a fine powder, and that in one case it also involves a large expenditure of labor to expose fresh surfaces of the molten lead for oxidation and to free it from the oxide of lead or litharge as it is formed. The process also is tedious. Moreover, from the comparative coarseness of the litharge which is obtained in the first operation, it has to be ground before subjecting it to superoxidizing by roasting.

The object of the present invention is to produce orange mineral and red lead with a large reduction of expense; and to this end my new process consists of two principal operations, the first of which is the production of the protoxide of lead or litharge in a pulverulent condition by subjecting comminuted lead to an inclosed or confined current of air heated to a temperature at which comminuted lead will burn in it, and in collecting the pulverulent oxide thereby produced, while the second operation consists in roasting the pulverulent oxide in air, so as to superoxidize it.

In order that my invention may be fully understood, I will proceed to describe the mode in which I have practiced it with success, and the apparatus which I have used with success in performing the first operation, it being, however, understood that my invention is not restricted to the forms of apparatus which I am about to describe and refer to.

Figure 2:
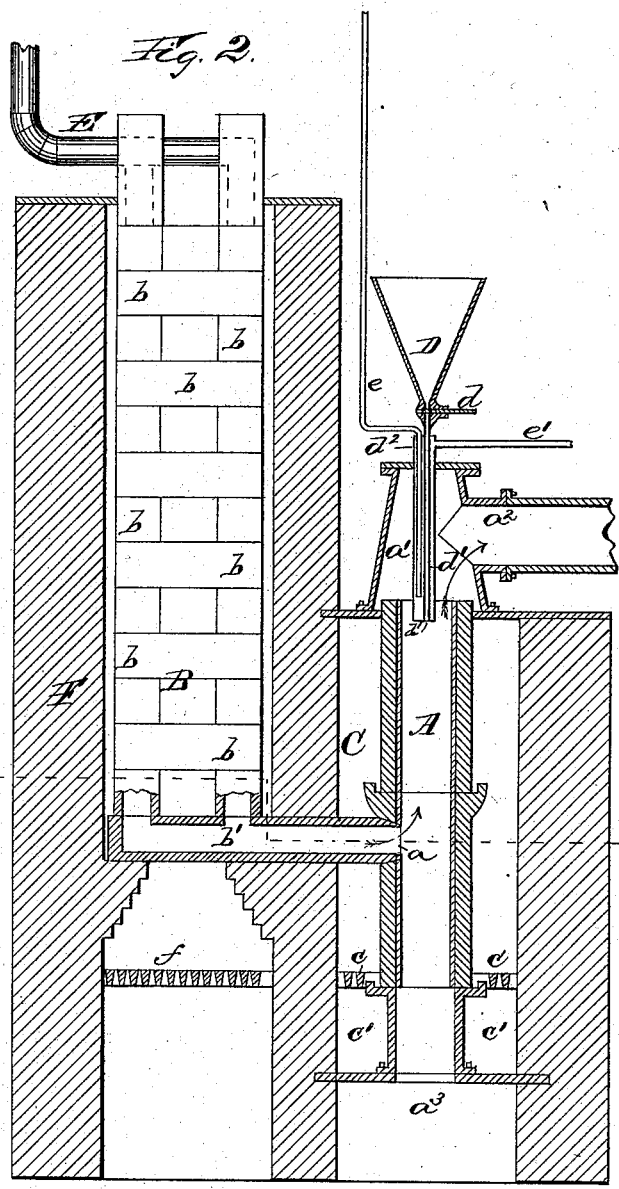
Figure 3:
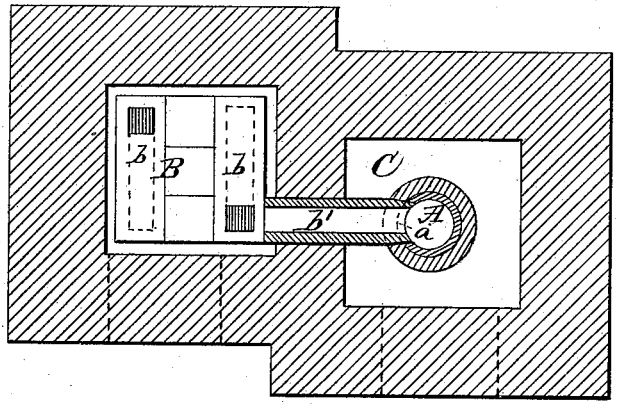
Figure 4:
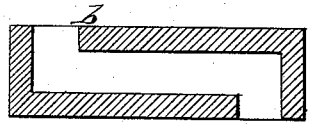

Figure 1 of the accompanying drawings represents a front view of an oxidizing-furnace which I have used with success in performing the first operation. Fig. 2 represents a vertical central section of the furnace with some parts in elevation. Fig. 3 represents a horizontal section of the furnace following the zigzag line $x$ $x$. Fig. 4 represents a section of one of the hollow fire-brick blocks of which the air-heating pipe is built up. Fig. 5 represents a vertical central section of a modified construction of oxidizing-furnace. Fig. 6 represents a horizontal section of the same at the line $x$ $x$ of Fig. 5.

The oxidizing-furnace, Figs. 1 to 4, inclusive, consists substantially of two parts—viz., an oxidizing-chamber, A, and an air-heating apparatus, B, both heated by means of burning fuel. The oxidizing-chamber A has the form of a pipe, which is sustained in a furnace, C, at the lower end of which there is a grate, $c$, upon which the fuel is burned. This chamber is provided above the grate with an opening or nozzle, $a$, by which it is connected with a heating apparatus, B, for heating air, and the said chamber is fitted at its upper end or head, $a'$, with an escape-pipe, $a^2$, by which the chamber is connected with a dust-collector. At the upper end of the oxidizing-chamber there is a charger, D, by means of which the metal to be oxidized is fed to the inclosed oxidizing-chamber, and the neck of this charger is preferably fitted with a sliding gate or valve, $d$, by means of which the supply of metallic lead can be regulated. The neck $d'$ of the charger is preferably extended into the oxidizing-chamber sufficiently to have the lower end of the neck below the orifice of the escape-pipe $a^2$, and as it is desirable to prevent the lead when previously comminuted from melting in the neck of the charger the extension of the neck into the said chamber is surrounded by a water-jacket, $d^2$, through which a current of water is caused to pass, the water being supplied by means of a water supply pipe, $e$, and the warm water being permitted to escape through an escape water-pipe, $e'$.

The air-heating apparatus may be of the same construction as the pipe hot-blast ovens used in the manufacture of pig-iron; but the air-heating apparatus which I have used with success consists of convoluted pipes $b$, formed of hollow fire-brick blocks that form two worm-like passages, which are analogous to the two threads of a double-threaded screw, and which communicate at their lower ends, by means of the connecting-pipe $b'$, with the nozzle $a$ of the oxidizing-chamber. The upper ends of the air-passages are connected, by means of a pipe, E, (a part only of which is shown in the drawings,) with an air-forcing machine, that which I have used with success being an ordinary Baker blower, and as the construction of air-forcing machines is well known in metallurgy I do not deem it necessary to describe one in detail. The convoluted pipe or pipes $b$ are sustained in a furnace, F, at the lower end of which there is a grate, $f$, on which fuel is burned to heat the pipes and the current of air which is forced through it by the air-forcing machine, so that the air is highly heated when it enters the oxidizing-chamber.

The lower end of the oxidizing-chamber is extended downward through the grate $c$ and through the ash-pit $c'$ of the furnace, and forms a receptacle, $a^3$, to receive any unoxidized lead, which may be removed at intervals through an opening or doorway provided for the purpose, said doorway being fitted with a door, $a^4$.

The escape-pipe $a^2$ of the oxidizing-chamber is connected with a dust-collector, which may be of any suitable construction, such as is used for collecting dust in the useful arts. Thus the said dust-collector may be a large chamber fitted with partitions forming a tortuous passage similar to the dust-collectors used in collecting flour-dust, or with a series of wire-cloth partitions; or the dust-collector may consist of a series of pipes with bag attachments similar to those used for collecting the oxide of zinc; or it may consist of a large chamber having such a bag collecting apparatus connected with it, so that the said chamber may collect the first portions of the oxide and the bag collectors may collect the residue; but when bag collectors are used the current proceeding from the oxidizing-chamber must be cooled sufficiently before it reaches the bags by being caused to pass through long pipes or otherwise to prevent the bags from being burned by the heat. In all cases the dust-collecting apparatus should be fitted with openings or doorways closed by doors to enable the litharge to be readily removed. As the construction of dust-collectors is well understood in metallurgy, I do not deem it necessary to describe them in detail.

In order that my process may be practiced, it is essential that the metallic lead to be treated shall be in a comminuted condition before it is oxidized, by which I mean that the metal to be oxidized shall be reduced to the condition of sand or minute globules, as distinguished from the metal in mass on the one hand and from metal in the condition of vapor on the other. I prefer that the lead shall be comminuted before it is fed into the oxidizing-furnace, and the mode of comminuting the lead which I prefer is to permit a stream of molten lead to fall upon a rapidly-revolving disk, the practical effect of which is to throw off the metal by centrifugal action in a powdery or sand-like condition, and as this mode of comminuting metal is well known in metallurgy it is unnecessary to describe it in detail.

I prefer to heat the oxidizing-chamber A to a temperature somewhat higher than that at which the lead to be treated will burn in air; but the heat should not be high enough to melt the oxide dust, and the hot-air apparatus should be hot enough to heat the current of air which is forced through it to a temperature at which the comminuted lead will burn in its passage through the oxidizing-chamber. When the air-forcing apparatus is in operation, a current of highly-heated air is forced through the oxidizing-chamber. The comminuted lead to be oxidized is placed into the charger D, and is permitted (by opening the gate $d$) to flow into the oxidizing-chamber A. The comminuted lead falls through the said chamber in a shower, so that the air has free access to its particles, which are acted upon simultaneously by heat and the current of air. Consequently the lead burns or oxidizes rapidly, and is converted mainly into pulverulent litharge. As the current of hot air in which the metal is burned is inclosed or confined by the walls of the oxidizing-chamber, the pulverulent litharge produced cannot escape from the current, but is carried off by the current and is deposited in the dust-collector, whence it may be removed through the doorways or openings provided for the purpose. If a bag dust-collector be used, its bags must be made of cloth porous to air, so that the air will filter through the cloth of the bags, leaving the lead oxide or litharge within them to be withdrawn at intervals, as is customary with this class of dust-collectors. Such larger particles of the comminuted lead as are not fully oxidized drop into the receiver $a^3$ at the lower end of the oxidizing-chamber, and may be removed at intervals through the doorway, provided as above described. Instead of connecting the upper orifice of the oxidizing-chamber with the dust-collector and the lower orifice, $a$, with the air-heating apparatus, the upper orifice, $a^2$, may be connected with the air-heating apparatus, and the lower orifice, $a$, or the upper portion of the receiver $a^3$, may be connected with the dust-collector, and in such case the current of air will be downward through the oxidizing-chamber.

The lead oxide or litharge is produced in such a finely-divided condition that it is particularly fitted for conversion into orange mineral. Moreover, as the oxidation is effected in a chamber from which the earthy products of the combustion of mineral fuel are excluded, the oxide is not soiled by admixture with earthy matter.

The oxidizing-chamber should be formed of a material that will withstand the heat, the part which is in the furnace having been constructed by me of fire-brick material, and it should, if necessary, be lined or coated on its interior with some material that will not melt readily when acted upon by the litharge. I have therefore found that it is expedient to line the inside of the part of the oxidizing-chamber which is within the furnace-body with bone-ashes, which may be moistened and rammed in around a wooden former or core, which is subsequently withdrawn.

As before stated, the apparatus used for practicing my said first operation may be varied. Thus, for example, if natural gas or other heating-gas can be had at a lower cost for the purpose than coal, the oxidizing-furnace above described may be heated with gas instead of with coal by using gas-burners of the usual construction instead of grates; or, as the burning of gas is not attended with the production of an earthy residuum, the gas may be burned in the oxidizing-chamber. A section of an oxidizing-furnace heated on the latter plan by natural gas is represented at Fig. 5. In this case the oxidizing-chamber A is fitted with burners $c$, through which natural gas is introduced, these gas-burners being of the construction of the well-known Bunsen burner, so that the gas is mixed with air. The action of the Bunsen burners introduces an excess of air and creates a strong draft upward through the oxidizing-chamber, and whatever additional air may be required to thoroughly oxidize the metal is admitted through one or more orifices $a$ beneath the gas-burners, a forced current being introduced if a current strong enough to make the operation practically successful is not obtained by draft. The gas-burners must be of sufficient capacity to heat the oxidizing-chamber and the current of air passing through the same to the requisite temperature for the rapid oxidation of the lead. The pulverulent litharge produced in the gas-furnace is carried out of the chamber with the current of air, and is collected in the dust-collector, as previously described with reference to the oxidizing-furnace first described in this specification.

The pulverulent litharge obtained from the dust-collector by the first operation is roasted in the same manner as is practiced in the production of orange mineral from white lead, and of red lead from the litharge produced by oxidizing a molten mass of lead, the pulverulent litharge obtained by my first operation being stirred during the roasting, so as to expose it thoroughly to the action of air. This roasting constitutes the second operation of my process. As the construction and management of a reverberatory furnace for such purpose are well understood in the art, it is not necessary to describe them.

The orange mineral and red lead obtained by my said process are not only produced with a less expenditure of labor than has hitherto been required, but are remarkably brilliant in color, which I believe to be due to the fact that the pulverulent litharge which is produced by the first operation, and is treated in the second operation, is in an extremely finely-divided condition, so that the superoxidation is more thorough than has hitherto been attained.

As the first operation above described for producing a metallic oxide has been made the subject of another application for a patent, filed February 21, 1887, Serial No. 228,290, it is not claimed separately by me in this patent.

I claim as my invention—

The process, substantially as before set forth, of manufacturing orange mineral and red lead, which consists, first, in exposing finely-comminuted metallic lead in a shower to an inclosed current of air heated to a temperature sufficient to burn the lead, and collecting the resultant pulverulent litharge, and, secondly, in roasting the said pulverulent litharge.

In witness whereof I have hereto set my hand this 17th day of February, A. D. 1887.

ARTHUR CROSSMAN BRADLEY.

Witnesses:
WALTER STABLER,
JAS. E. WARNER.